United States Patent
Ishimoto

(10) Patent No.: US 7,933,177 B2
(45) Date of Patent: Apr. 26, 2011

(54) OPTICAL PICKUP APPARATUS, OPTICAL READ/WRITE APPARATUS, AND GAP CONTROL METHOD

(75) Inventor: Tsutomu Ishimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 314 days.

(21) Appl. No.: 12/335,912

(22) Filed: Dec. 16, 2008

(65) Prior Publication Data

US 2009/0168633 A1 Jul. 2, 2009

(30) Foreign Application Priority Data

Dec. 26, 2007 (JP) ................................ 2007-335080

(51) Int. Cl.
*G11B 7/00* (2006.01)
(52) U.S. Cl. ............................... 369/44.29; 369/112.24
(58) Field of Classification Search .................. None
See application file for complete search history.

(56) References Cited

U.S. PATENT DOCUMENTS

| 7,145,304 | B1 | 12/2006 | Jodorkovsky et al. | |
|---|---|---|---|---|
| 7,260,032 | B2 * | 8/2007 | Tadano | 369/44.29 |
| 7,826,317 | B2 * | 11/2010 | Ishimoto | 369/44.32 |
| 2006/0187773 | A1 * | 8/2006 | Ishimoto | 369/44.25 |
| 2007/0091743 | A1 | 4/2007 | Lee et al. | |
| 2007/0280065 | A1 * | 12/2007 | Fukuhara | 369/44.29 |
| 2008/0267036 | A1 * | 10/2008 | Lee et al. | 369/100 |
| 2008/0304395 | A1 * | 12/2008 | Lee | 369/112.23 |
| 2009/0067302 | A1 * | 3/2009 | Ishimoto | 369/47.15 |
| 2009/0168633 | A1 * | 7/2009 | Ishimoto | 369/112.24 |
| 2009/0180372 | A1 * | 7/2009 | Jeong et al. | 369/112.23 |

FOREIGN PATENT DOCUMENTS

| EP | 0441435 A | 8/1991 |
|---|---|---|
| EP | 1724771 A | 11/2006 |
| GB | 2083252 A | 3/1982 |
| JP | 2001-076358 A | 3/2001 |
| JP | 2006-313589 A | 11/2006 |
| WO | WO 2007/004144 A | 1/2007 |

OTHER PUBLICATIONS

Ishimoto, T. et al., "Technologies for removability in a near-field optical disc system", *Proc. of SPIE*, 2006, vol. 6282, Paper No. 6282-12, Society of Photo-Optical Instrumentation Engineers, USA.

(Continued)

*Primary Examiner* — Peter Vincent Agustin
(74) *Attorney, Agent, or Firm* — Wolf, Greenfield & Sacks, P.C.

(57) ABSTRACT

An optical pickup apparatus includes a light source, focusing optics, a light detector, a controller, and a drive unit. The drive unit first drives the focusing optics to a specific position on an information recording medium. Light from the light source irradiates the information recording medium via the focusing optics as near-field light. Light reflected off the medium due to total internal reflection is then detected by the light detector, generating a gap error signal as a result. The controller then generates a gap servo signal by conducting a feed-forward control, whereby a push-pull signal in the direction orthogonal to the relative travel direction of the medium is applied to the gap error signal. In so doing, precise control of the gap size between the focusing optics and the information recording medium is achieved for near-field read/write operations.

8 Claims, 9 Drawing Sheets

OTHER PUBLICATIONS

Verschuren C.A. et al., "Cover-Layer incident Near-Field Recording: Towards 4-Layer Discs using Dynamic tilt Control", Optical Data Storage Topical Meeting, 2006 Montreal, Quebec, Canada; Apr. 23, 2006; pp. 135-137; Piscataway, New Jersey.

Ishimoto, Tsutomu et al., "Servo Technologies in a Near-Field Optical Disk Drive System", Japanese Journal of Applied Physics, Jul. 18, 2008, pp. 5814-5821, vol. 47 No. 7,The Japan Society of Applied Physics.

* cited by examiner

Rpp=(A+B)−(C+D)

OPTICAL PICKUP APPARATUS, OPTICAL READ/WRITE APPARATUS, AND GAP CONTROL METHOD

CROSS REFERENCES TO RELATED APPLICATIONS

The present invention contains subject matter related to Japanese Patent Application JP 2007-335080 filed in the Japanese Patent Office on Dec. 26, 2007, the entire contents of which are incorporated herein by reference.

BACKGROUND OF THE INVENTION

1. Field of the Invention

The present invention relates to an optical pickup apparatus, an optical read/write apparatus, and a gap control method applicable to an information recording medium that uses near-field optics.

2. Description of the Related Art

In recent years, there has been interest in read/write techniques using near-field optics (also referred to as evanescent waves), wherein lights spills out from the interface when the inter-object spacing becomes less than a certain distance. Such near-field techniques are of interest in order to achieve high write densities and high resolutions in information recording media such as optical discs and optical memory cards. Such near-field optical read/write techniques involve extremely fine control, wherein the gap between the lens or other near-field optical radiating means and the surface of the information recording medium is typically on the order of one-fifth to one-half the wavelength of the light used to read and write information.

The focusing optics for generating near-field light may involve a high numerical aperture (NA) objective lens made from an aspherical or similar lens, as well as a solid immersion lens (SIL) interposed between the objective lens and the information recording medium. Using such an SIL involves maintaining the gap between the SIL and the surface of the optical disc or similar information recording medium such that the gap distance generates near-field light (i.e., the gap is not more than one-half to one-fifth the wavelength of the light, as described above). Furthermore, the position of the SIL is also controlled in the above case, in order to track runout of the information recording medium (i.e., disc surface runout in the case of disc-shaped information recording media). For this reason, control methods have been proposed wherein, for example, a desired gap size is detected and maintained using the amount of reflected light due to total internal reflection (see Japanese Unexamined Patent Application Publication No. 2001-76358, for example).

The control method cited above utilizes the fact that the amount of reflected light due to total internal reflection is proportional to gap size at distances whereby near-field light is generated. More specifically, the above method maintains a fixed gap by using a feedback servo loop that stabilizes a servo loop system with a phase compensation filter, with the amount of reflected light due to total internal reflection being used as a gap error signal.

Consider the following example, wherein the distance for generating near-field light is maintained at a reference value of 20 nm, the allowable deviation is 5 nm, the allowable surface runout is 40 μm, and the rotational frequency of the disc-shaped information recording medium is 3000 rpm. Given the above values, the band becomes 8 kHz. In practice, however, disturbances due to disc rotation result in pronounced rotationally synchronous components, and thus it becomes difficult to control the gap size with precision, even when a band greater than 8 kHz is achieved.

In order to resolve this problem, methods have been proposed wherein a repeating servo is used (see Japanese Unexamined Patent Application Publication No. 2006-313589, for example). The repeating servo stores the error signal for a single rotation in external memory. By subsequently applying the gap error signal of an ordinary feedback servo loop as a feed-forward signal, gain having a peak at the rotational frequency component is obtained. (See also T. Ishimoto et al., "Technologies for removability in a near-field optical disc system", Proceedings of SPIE Reprint, Vol. 6282, 62820C, 2006.)

SUMMARY OF THE INVENTION

However, although disturbances in the rotational frequency component are effectively eliminated when a repeating servo is used like that proposed in JP-A-2006-313589 and by Ishimoto et al., the above also involves providing memory for externally storing the disturbance in a single rotation. For this reason, a signal indicating position on the same circumference is obtained in order to read from the memory. The method for obtaining such a position signal may involve installing a rotary encoder in the spindle motor that causes the disc to rotate, writing rotational position information to the disc, or separately providing a detector and reading a position signal therefrom.

According to the present invention, a feed-forward servo is conducted using a radial tilt error signal and without using a repeating servo as described above, thereby making it possible to improve gap servo capability without raising the gap servo band.

If there existed a method for precisely controlling the gap without using a repeating servo, then it would be possible to simplify apparatus configuration by eliminating components such as the external memory and the means for reading position information as described above. For example, if precise gap control could be conducted without installing the above rotary encoder or similar component even at high rotational frequencies wherein a disc-shaped information recording medium is rotating at approximately 3000 rpm, then it would be possible to precisely control the gap using an apparatus having a simpler configuration.

In light of the foregoing problems, when performing read/write operations by irradiating an information recording medium with near-field light, there is demand for technology enabling precise control of the gap between the focusing optics and the information recording medium using an apparatus having a comparatively simple configuration.

An optical pickup apparatus in accordance with an embodiment of the present invention addresses the foregoing problems, and includes: a light source; focusing optics that irradiate an information recording medium by radiating light from the light source as near-field light; a light detector that detects the amount of reflected light from the information recording medium due to total internal reflection; a controller that generates a control signal on the basis of a detection signal obtained from the light detector; and a drive unit that drives the focusing optics to a specific position on the information recording medium. The controller is configured to generate a gap servo signal by conducting a feed-forward control, whereby a push-pull signal in the direction orthogonal to the relative travel direction of the information recording medium is applied to a gap error signal obtained from the light detector.

In addition, an optical read/write apparatus in accordance with an embodiment of the present invention includes an optical pickup apparatus, an information recording medium loading unit, and a media drive unit. The optical pickup apparatus is provided with: a light source; focusing optics that irradiate an information recording medium by radiating light from the light source as near-field light; a light detector that detects the amount of reflected light from the information recording medium due to total internal reflection; a controller that generates a control signal on the basis of a detection signal obtained from the light detector; and an optics drive unit that drives the focusing optics to a specific position on the information recording medium. The media drive unit causes the information recording medium loading unit to move relative to the focusing optics provided in the optical pickup apparatus. The controller provided in the optical pickup apparatus is configured to generate a gap servo signal by conducting a feed-forward control, whereby a push-pull signal in the direction orthogonal to the relative travel direction of the information recording medium is applied to a gap error signal obtained from the light detector.

In addition, in a gap control method in accordance with an embodiment of the present invention, a gap servo signal is obtained as a result of conducting a feed-forward control, whereby a push-pull signal in the direction orthogonal to the relative travel direction of an information recording medium is applied to a gap error signal obtained by detecting the amount of reflected light between an optical lens and the information recording medium due to total internal reflection.

As described above, in the present invention, a control is conducted with respect to the gap in focusing optics that radiate near-field light. The control generates a gap servo signal by conducting a feed-forward control, whereby a push-pull in the direction orthogonal to the relative travel direction of an information recording medium (i.e., the radial direction in the case of a disc-shaped information recording medium) is applied to a gap error signal. By computing a gap servo signal in this way, it is readily seen that residual error in the gap servo system is improved, and advantages are obtained equivalent to those of a repeating servo. As described hereinafter, the above is due to the fact that the push-pull signal in the direction orthogonal to the relative travel direction of the information recording medium (i.e., the radial direction in the case of a disc-shaped information recording medium) is in phase with and similar to the gap error signal.

Furthermore, since the push-pull signal is applied to the gap error signal in a feed-forward control, the present invention is advantageous in that external memory can be eliminated from the configuration thereof, unlike the case of a repeating servo. In other words, the feed-forward control operates without storing a repeating gap signal for a single rotation (in the case of a disc-shaped information recording medium).

More specifically, according to an embodiment of the present invention, a signal equivalent to the repeating signal is generated by computing an optically-obtained gap error signal. By subsequently conducting a feed-forward control using this obtained signal, it becomes possible to achieve gap control performance equivalent to that of a repeating servo.

According to an embodiment of the present invention, when irradiating an information recording medium with near-field light, the gap between the focusing optics and the information recording medium can be precisely controlled using an apparatus having a comparatively simple configuration.

DESCRIPTION OF THE PREFERRED EMBODIMENTS

Hereinafter, exemplary embodiments of the present invention will be described, but it should be appreciated that the present invention is not limited to the examples given below.

Figure 1:
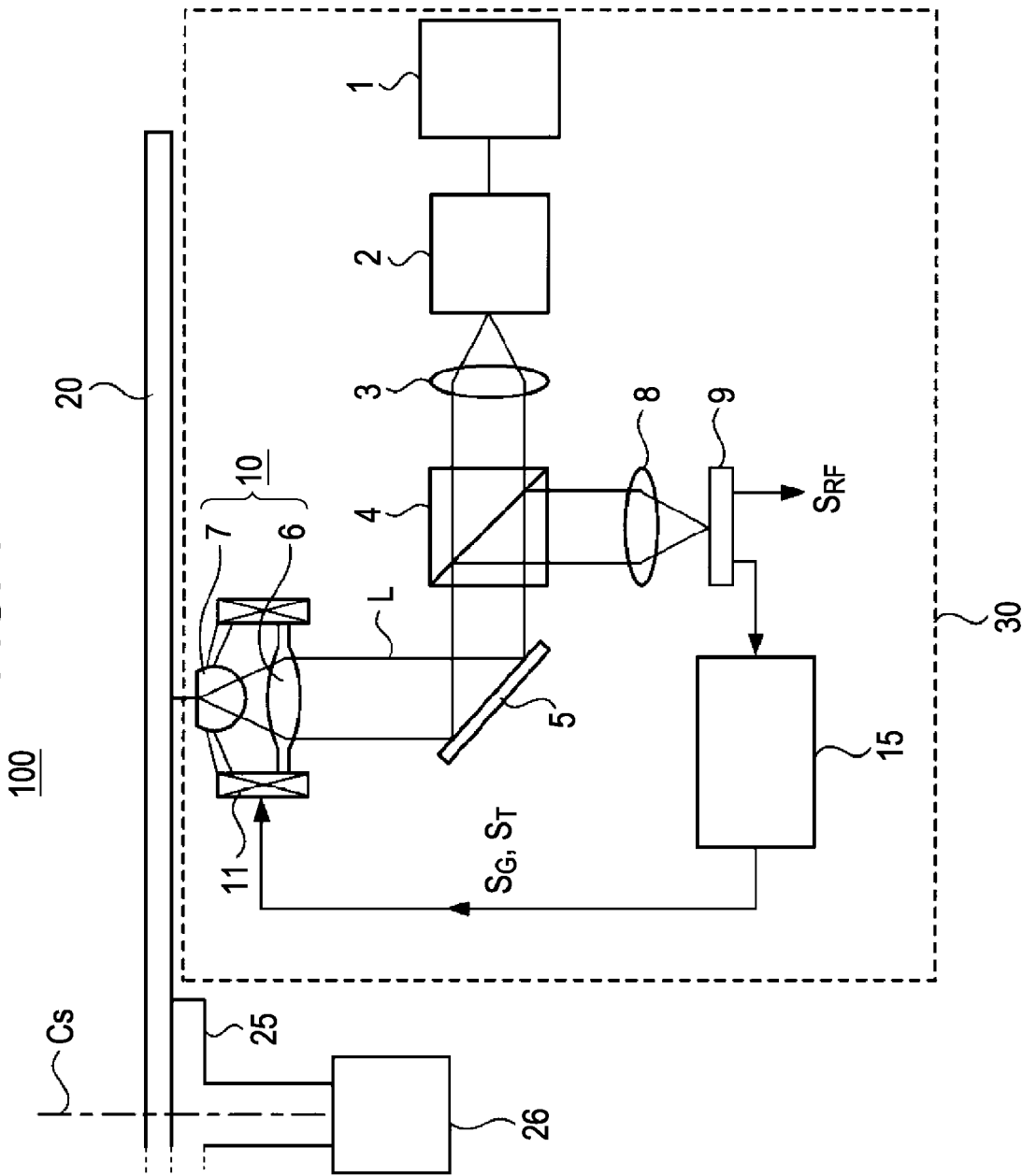
FIG. 1 is a diagram schematically illustrating the configuration of an optical read/write apparatus included in an optical pickup apparatus in accordance with an embodiment of the present invention.

FIG. 1 is a diagram schematically illustrating the configuration of an optical read/write apparatus 100 provided with an optical pickup apparatus 30 in accordance with a first embodiment of the present invention. In the present example, focusing optics 10 are shown as including an optical lens 6, which acts as the objective lens and is formed as an aspherical or similar lens, as well as a hemispherical or superhemispherical solid immersion lens (SIL) 7. Although a superhemispherical SIL is shown in FIG. 1, a hemispherical SIL may also be used. The optical pickup apparatus 30 is provided with a power controller 1, a light source 2 such as a laser diode, a collimating lens 3, a beam splitter 4, a mirror 5, focusing optics 10 that include the optical lens 6 and the SIL 7, a focusing lens 8 disposed in the split light path formed by the beam splitter 4, and a light detector 9 such as a quadrant photodiode. In addition, the optical pickup apparatus 30 also includes a controller 15 that processes the detection signal from the light detector 9 to generate a control signal (i.e., a gap error signal $S_G$) for controlling the optics drive unit 11 of the focusing optics 10. The controller 15 may also be configured to generate and output to the optics drive unit 11 a tilt error signal $S_T$ for controlling the tilt of the SIL 7 with respect to the information recording medium 20.

The optical read/write apparatus 100 is further provided with a loading unit 25 for loading a disc-shaped or similar information recording medium 20, as well as a media drive unit 26 for rotationally driving the loading unit 25 about a rotary axis (such as the axis indicated by the broken line Cs in FIG. 1, for example).

In the above configuration, light emitted from the light source 2 is collimated by the collimating lens 3, passed through the beam splitter 4, reflected off the mirror 5, and finally incident on the focusing optics 10. Herein, when writing information, the power controller 1 controls the output of the light source 2 in accordance with, for example, write information supplied from an information storage unit not shown in the drawings. When reading information, the output control from the power controller 1 may be omitted, and the output of the light source 2 may be fixed. By means of the focusing optics 10, the light from the light source 2 irradiates the writable surface of the information recording medium 20 as near-field light. The light reflected off the information recording medium 20 is subsequently reflected by the mirror 5, reflected again by the beam splitter 4, and then focused on the light detector 9 by the focusing lens 8.

A portion of the light detected by the light detector 9 is output as an RF (i.e., high-frequency) signal $S_{RF}$ when reading with respect to recorded information on the information recording medium 20. Meanwhile, the amount of reflected light due to total internal reflection is input into the controller 15, which generates a signal for controlling the optics drive unit 11 that drives the focusing optics 10. A tilt control signal $S_T$ and a gap control signal $S_g$ generated as a result of a feed-forward control (to be hereinafter described) by the controller 15 is output to the optics drive unit 11. The optics drive unit 11 may be configured as a two-way or three-way actuator that includes a voice coil motor, for example. The gap control drive unit and the tilt control drive unit may also be provided separately, with separate control signals being input into the respective drive units. Furthermore, in addition to the components in the configuration shown in FIG. 1, various optical elements for aberration correction or similar functions may be additionally disposed in the optical pickup apparatus 30.

The optical read/write apparatus 100 is configured such that the information recording medium 20 is loaded into the media drive unit 26, which rotationally drives the information recording medium 20. In addition, the optical pickup apparatus 30 is mounted onto, for example, a horizontal movement mechanism (not shown in the drawings) that moves parallel to the writable surface of the information recording medium 20. As a result of the combined operation of the horizontal movement mechanism and the media drive unit 26, near-field light emitted from the focusing optics 10 is scanned in spiral or concentric patterns, for example, that follow write tracks on the surface of the information recording medium 20.

Figure 2A:
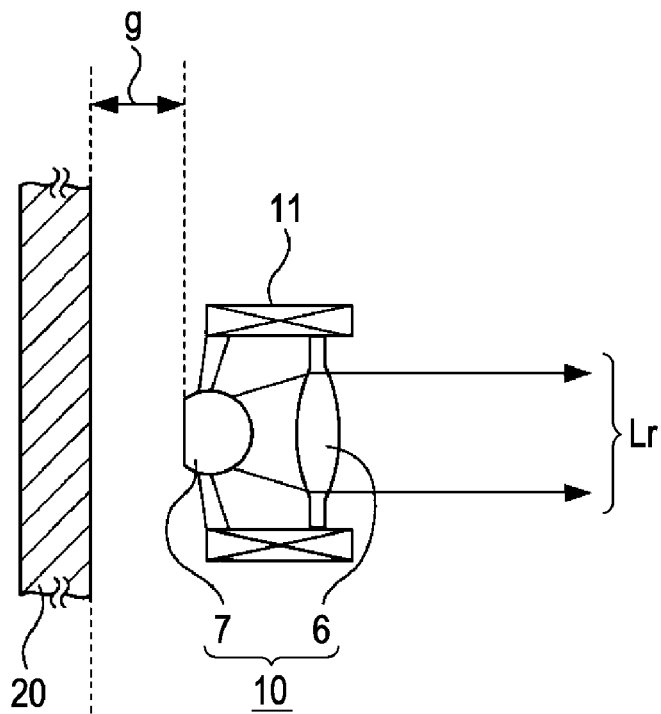
FIG. 2A is a diagram for explaining the amount of reflected light due to total internal reflection.
Figure 2B:
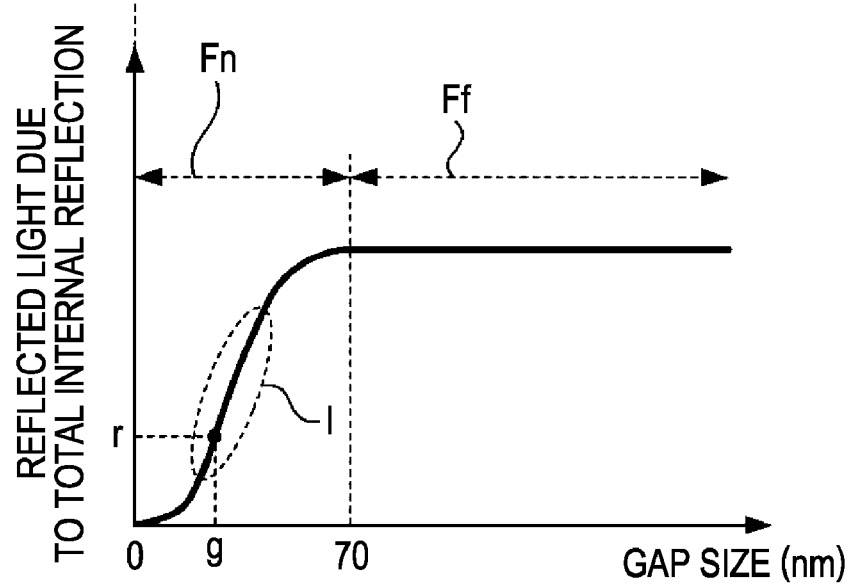
FIG. 2B is a diagram for explaining the amount of reflected light due to total internal reflection.

FIGS. 2A and 2B schematically illustrate the relationship between the gap size and the amount of reflected light due to total internal reflection in an optical pickup apparatus 30 that uses near-field light. FIG. 2A schematically illustrates the gap between the information recording medium 20 and the edge face of the SIL 7 (being part of the focusing optics 10 that includes the optical lens 6 and the SIL 7). FIG. 2B illustrates the relationship between the gap size and the amount of reflected light due to total internal reflection. In this case, the amount of reflected light due to total internal reflection is the amount of reflected light incident at angles above the critical angle on the edge face of the SIL 7 that faces the information recording medium (i.e., the components of the light for which the aperture ratio is equal to or greater than 1).

As shown in FIG. 2B, in the far-field region Ff (i.e., the region that does not exhibit near-field properties), the gap size is typically not less than one-fifth to one-half the wavelength of the incident laser light. In this far-field region Ff, all light incident on the SIL edge face is the result of total internal reflection, and thus the amount of reflected light due to total internal reflection becomes fixed. In contrast, for gap sizes not more than one-fifth to one-half the wavelength of the incident laser light, the relationship shown in FIG. 2B typically enters a near-field region Fn, wherein near-field properties are exhibited. The example shown in FIG. 2B illustrates the exemplary case wherein the wavelength of the incident light is 405 nm. In this case, the amount of reflected light due to total internal reflection begins to decrease for gap sizes less than 70 nm. The relationship between wavelength and gap sizes that result in a near-field region is not uniform, and the above range of one-fifth to one-half the wavelength may vary depending on the wavelength and the material construction of the information recording medium and the SIL.

In the near-field region Fn, evanescent coupling occurs between the SIL edge face and the surface of the information recording medium, and a portion of the reflected light due to total internal reflection passes through the SIL edge face on the side of the information recording medium. For this reason, the amount of reflected light due to total internal reflection decreases. When the SIL fully contacts the information recording medium, all of the reflected light due to total internal reflection passes through the SIL edge face on the side of the information recording medium, and thus the amount of reflected light due to total internal reflection becomes zero. Consequently, the relationship between the gap size (existing between the SIL edge face and the information recording medium) and the amount of reflected light due to total internal reflection is as shown in FIG. 2B, with a constant amount of reflected light due to total internal reflection in the far-field region Ff, and a gradually decreasing amount of reflected light due to total internal reflection in the near-field region Fn, the amount of light reaching zero when the gap size becomes zero. In addition, in the region where the amount of reflected light due to total internal reflection decreases, there also exists a region wherein the relationship between the gap size and the amount of reflected light due to total internal reflection becomes a linear relationship (indicated by the area enclosed by the broken line 1 in FIG. 2B). Consequently, by creating a feedback loop using the amount of reflected light due to total internal reflection as a gap error value for the linear region described above, it becomes possible to maintain a gap of fixed size. In other words, in the case where the reference gap size is the value g shown in FIG. 2B, a control may be conducted to make the amount of reflected light due to total internal reflection equal to the value r.

Figure 3:
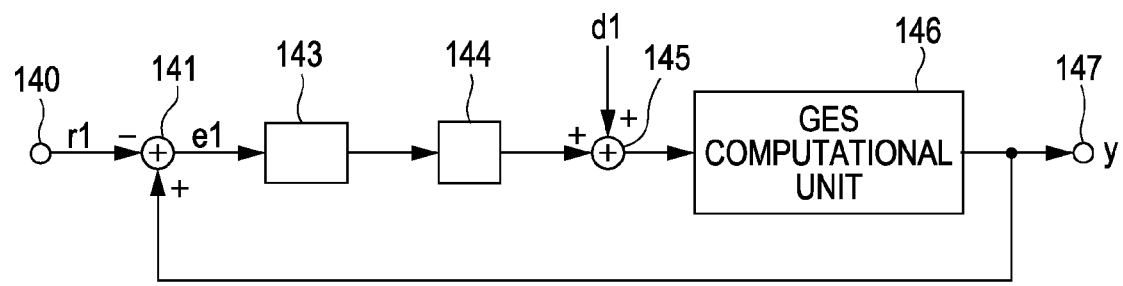
FIG. 3 is a diagram illustrating the configuration of a servo loop in a comparative example.

As a comparative example, FIG. 3 illustrates an exemplary servo loop for the case wherein gap control is conducted by means of an ordinary feedback loop. In this case, the servo loop includes a subtractor 141, a servo filter 143 such as a phase compensation filter or lead-lag filter, a control object 144, an adder 145, and a GES computational unit 146. In addition, in FIG. 3, r1 is the gap reference signal (i.e., the reference value for the amount of reflected light due to total internal reflection shown in FIG. 2B), d1 is a disturbance signal due to disc surface runout, and e1 is the error between the reference value and the gap error signal (GES). The above signals are related as follows: e1=y1−r1. The control object 144 is the actuator itself, upon which the SIL is installed. In other words, the control object 144 is the optics drive unit 11 shown in FIG. 1. The GES computational unit 146 includes the light detector 9 shown in FIG. 1, as well as other components such as an analog-to-digital converter and an amplifier.

The reference signal r1 is input from an input lead 140 and subsequently supplied to the subtractor 141, together with a detection signal y1 that is output from the GES computational unit 146 to be hereinafter described. The subtractor 141 performs a subtraction operation according to the equation e1=y1−r1, and then outputs e1. The signal e1 is then processed by the servo filter 143 and subsequently input into the control object 144. The detection signal is modified according to the movement of the control object 144, and then the disturbance d1 is added thereto by the adder 145. Finally, the GES (i.e., the signal y1) is output from the GES computational unit 146. As shown in FIG. 3, in this case, the servo loop is configured to maintain a gap of fixed size between the SIL edge face and the information recording medium by applying the gap error signal (GES) y1 in a feedback control.

However, when attempting to control the gap size in this way by means of a feedback control that applies a GES, it becomes difficult to track the surface runout of the information recording medium as the rotational frequency of the information recording medium increases, and thus the magnitude of the gap error increases. For this reason, residual error from the rotational component is superimposed on the gap error signal.

According to an embodiment of the present invention, it becomes possible to reduce residual error from such rotationally synchronous components. A control conducted in accordance with an embodiment of the present invention will now be described.

Figure 4:
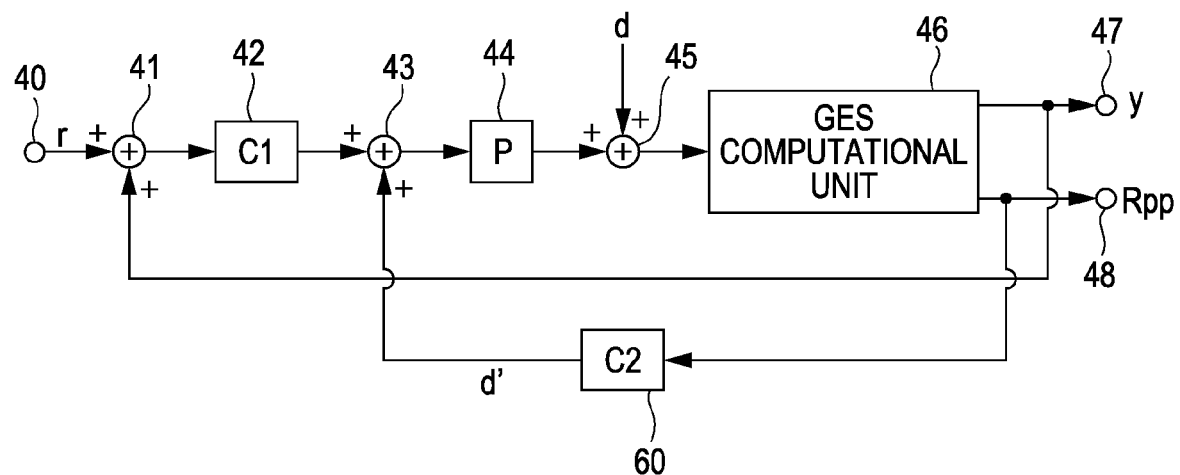
FIG. 4 is a diagram illustrating the configuration a servo loop in the controller of an optical pickup apparatus in accordance with an embodiment of the present invention.

FIG. 4 is a diagram illustrating the configuration of a servo loop in the controller 15 of an optical pickup apparatus in accordance with an embodiment of the present invention. As shown in FIG. 4, in this case, the servo loop is configured to include an adder 41, a servo filter 42 on the main loop, an adder 43, a control object 44, an adder 45, a GES computational unit 46, and a servo filter 60 for the feed-forward signal Rpp. A low-pass or similar filter may be used as the servo filter 60.

The reference value r is input from an input lead 40 and then input into the control object 44 (in this case, the optics drive unit 11 shown in FIG. 1) via the adder 41, the servo filter 42, and the adder 43. The subsequent output is varied according to the movement of the control object 44, and the disturbance d is added thereto by the adder 45, and finally the amount of reflected light due to total internal reflection is detected by the GES computational unit 46.

Figure 5:
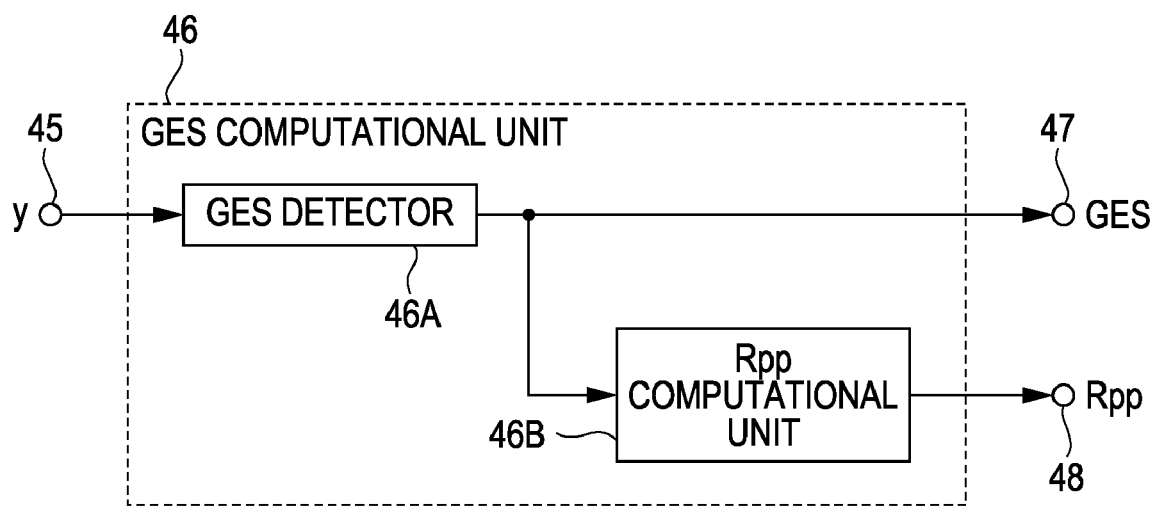
FIG. 5 is a diagram illustrating an exemplary configuration of a GES computational unit in the controller shown in FIG. 4.

FIG. 5 is a diagram illustrating an exemplary configuration of the GES computational unit 46 shown in FIG. 4. In the GES computational unit 46, the amount of reflected light due to total internal reflection (in this case, the amount of light incident on the SIL 7 in the focusing optics 10) is detected by a GES detector 46A. In the GES detector 46A, a four-way detector detects the amount of reflected light due to total internal reflection in both the relative travel direction of the information recording medium as well as the direction orthogonal thereto. In other words, in the case of a disc-shaped information recording medium, the amount of reflected light due to total internal reflection is detected in both the tangential direction as well as the radial direction. The total amount of reflected light due to total internal reflection is then output as a GES from an output lead 47 and subsequently applied by the adder 41 as feedback.

Meanwhile, on the basis of the split light, the Rpp computational unit 46B computes and outputs a push-pull signal Rpp for the relative travel direction with respect to the information recording medium (in the present case, a radial push-pull signal). The same four-way split amount of reflected light due to total internal reflection may also be used to compute a tangential push-pull signal Tpp. The obtained Rpp is output from an output lead 48, while also being supplied for use in an add operation by the adder 43 via the servo filter 60. Thus, Rpp constitutes the applied signal in the feed-forward control.

Figure 6A:
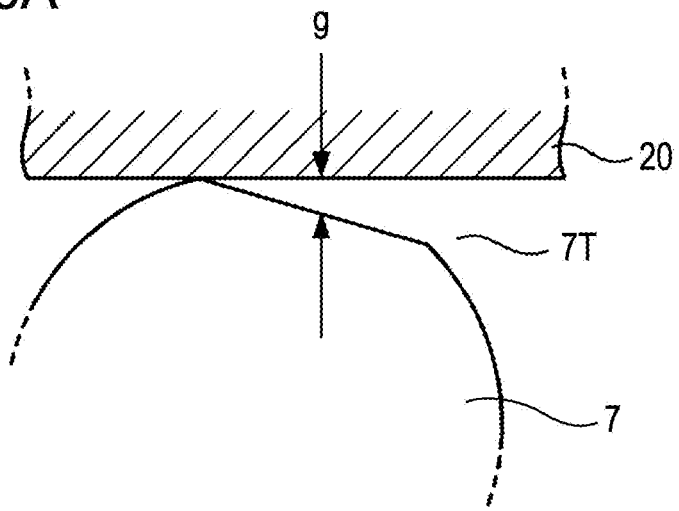
FIG. 6A is a cross-sectional diagram illustrating tilt between an SIL and an information recording medium.
Figure 6B:
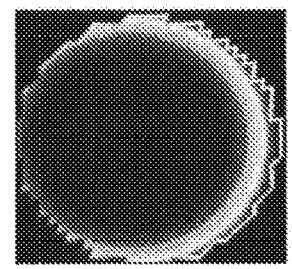
FIG. 6B is a diagram illustrating an example of reflected light due to total internal reflection.
Figure 6C:
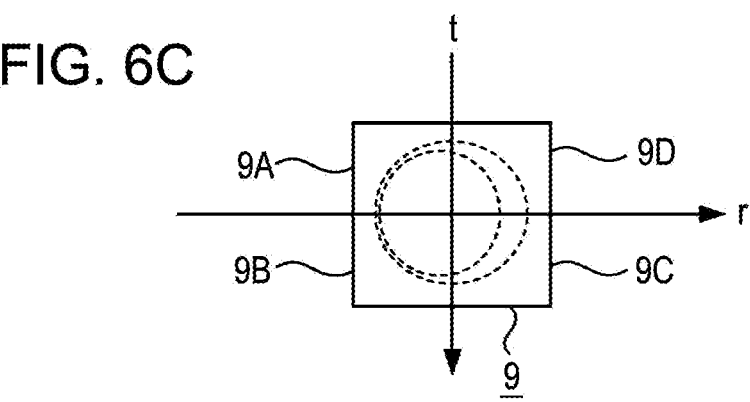
FIG. 6C is a diagram illustrating the configuration of a light detector.

As shown in FIG. 6A, when the edge face 7T (i.e., the edge face that faces the information recording medium 20) of the SIL 7 becomes tilted due to surface runout or a similar factor, the detected amount of reflected light due to total internal reflection becomes like that schematically illustrated using contrasting tones in FIG. 6B. More specifically, an amount of reflected light corresponding to the gap is detected at the portion of the edge face 7T spaced farther away from the surface of the information recording medium 20 (i.e., the farther portion results in a far-field region). In FIG. 6C, the arrows t and r respectively indicate the tangential and radial directions, while the detection regions of the light detector 9 whereby light is split four ways according to the above directions are respectively indicated as the regions 9A, 9B, 9C, and 9D. As shown by the broken lines in FIG. 6C, when tilt occurs between the information recording medium 20 and the SIL 7, there also occurs an intensity difference with respect to the reflected light in the tangential and/or radial direction. In other words, a difference in signal strength occurs in the GES.

Herein, the individual signals from the regions 9A to 9D are respectively referred to as the signals A to D. If Tpp is taken to be error signal in the tangential direction, and Rpp is taken to be the error signal in the radial direction, then the above signals may be defined as follows.

$$Tpp=(A+D)-(B+C) \quad (1)$$

$$Rpp=(A+B)-(C+D) \quad (2)$$

Figure 7:
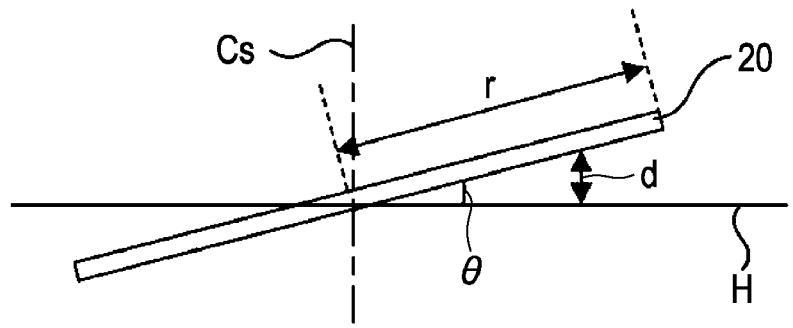
FIG. 7 is a diagram schematically illustrating the tilt angle θ of an information recording medium as well as the radial tilt quantity d.

The value of Rpp is also proportional to the runout disturbance d. More specifically, if the information recording medium 20 is assumed to be tilted in the radial direction by a tilt angle $\theta$, as illustrated schematically in FIG. 7, then the amount of runout disturbance d at a position of radius r is determined as follows.

$$\theta=\sin^{-1}(d/r) \quad (3)$$

Since Rpp is proportional to the amount of radial tilt, Rpp can also be expressed as follows.

$$Rpp=k\times\theta \quad (4)$$

Since the tilt angle of the information recording medium is typically very small, Eq. 3 can be approximated as follows.

$$\theta\approx d/r \quad (5)$$

Consequently, according to Eqs. 4 and 5, Rpp can be expressed as follows.

$$Rpp=k\times(d/r) \quad (6)$$

In other words, the value of Rpp is proportional to the runout disturbance d at the radius r at which the gap servo operates.

Figure 8:
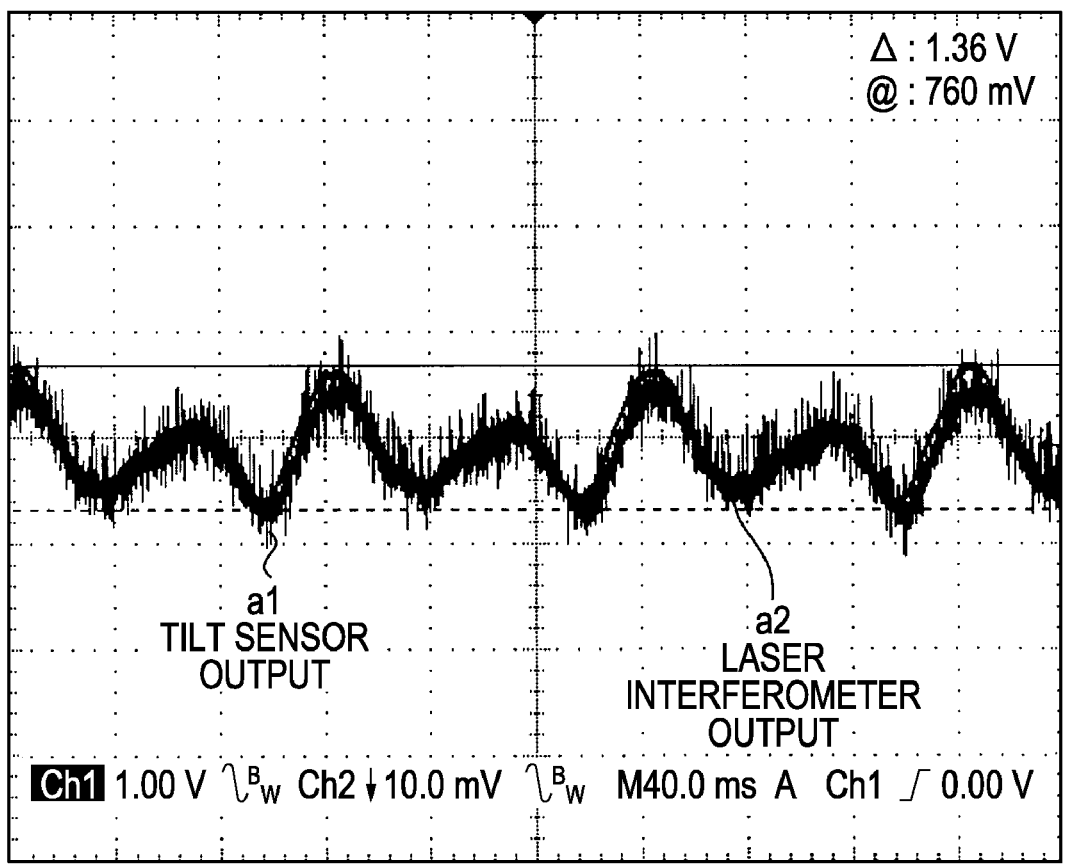
FIG. 8 is a waveform diagram illustrating the output of a radial tilt sensor as well as the output of a laser interferometer (i.e., the amount of surface runout)

Upon reviewing actual results comparing a radial signal observed by a tilt sensor to runout disturbance amounts measured by a laser displacement sensor, it can be seen that the results match, as illustrated by the tilt sensor output a1 and the laser interferometer output a2 shown in the waveform diagram in FIG. 8. In other words, it can be seen that the relationship in Eq. 6 is satisfied.

Given the above, since Rpp is proportional to the runout disturbance d, the effects of runout disturbance can be lessened by applying Rpp as a feed-forward signal to an actuator (i.e., the control object shown in FIG. 4) according to the following.

$$Rpp = \alpha \times d \quad (7)$$

Figure 9:
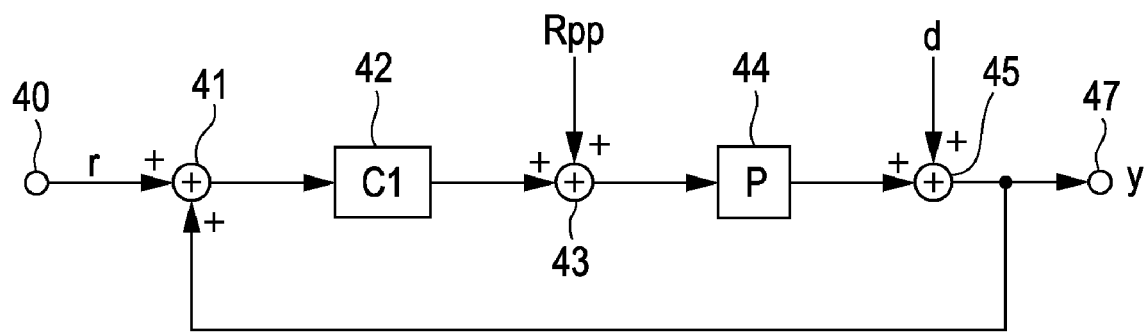
FIG. 9 is diagram illustrating the configuration of a simplified servo loop in a controller of an optical pickup apparatus in accordance with an embodiment of the present invention.

The servo loop shown in FIG. 4 can be simplified to be like that shown in FIG. 9. An equivalent modification of the servo loop shown in FIG. 9 is shown in FIG. 10.

Figure 10:
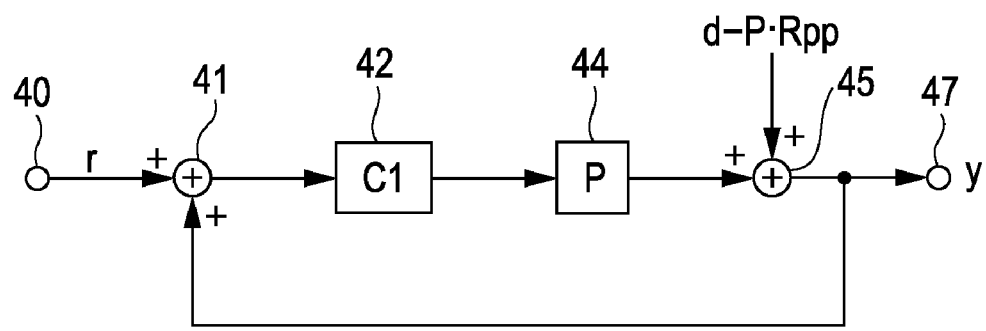
FIG. 10 is a diagram illustrating the configuration of a simplification of the servo loop shown in FIG. 9.

In FIG. 10, if the disturbance term (d−P×Rpp) becomes zero, then the effects of the disturbance are eliminated. For this reason, it is preferable for $$d = P \times Rpp \quad (8)$$

to hold true.

By substituting Eq. 7 into Eq. 8, the following Eq. 9 is obtained.

$$d = P \times \alpha \times d \quad (9)$$

Consequently, according to Eq. 9, the proportional gain α becomes the following.

$$\alpha = 1/P \quad (10)$$

Although α is a constant according Eq. 7, α is not a constant according to Eq. 10. However, since the transfer function P of the actuator yields a fixed gain for frequencies less than the first-order resonant frequency, the condition that α be a constant can be satisfied.

Figure 11:
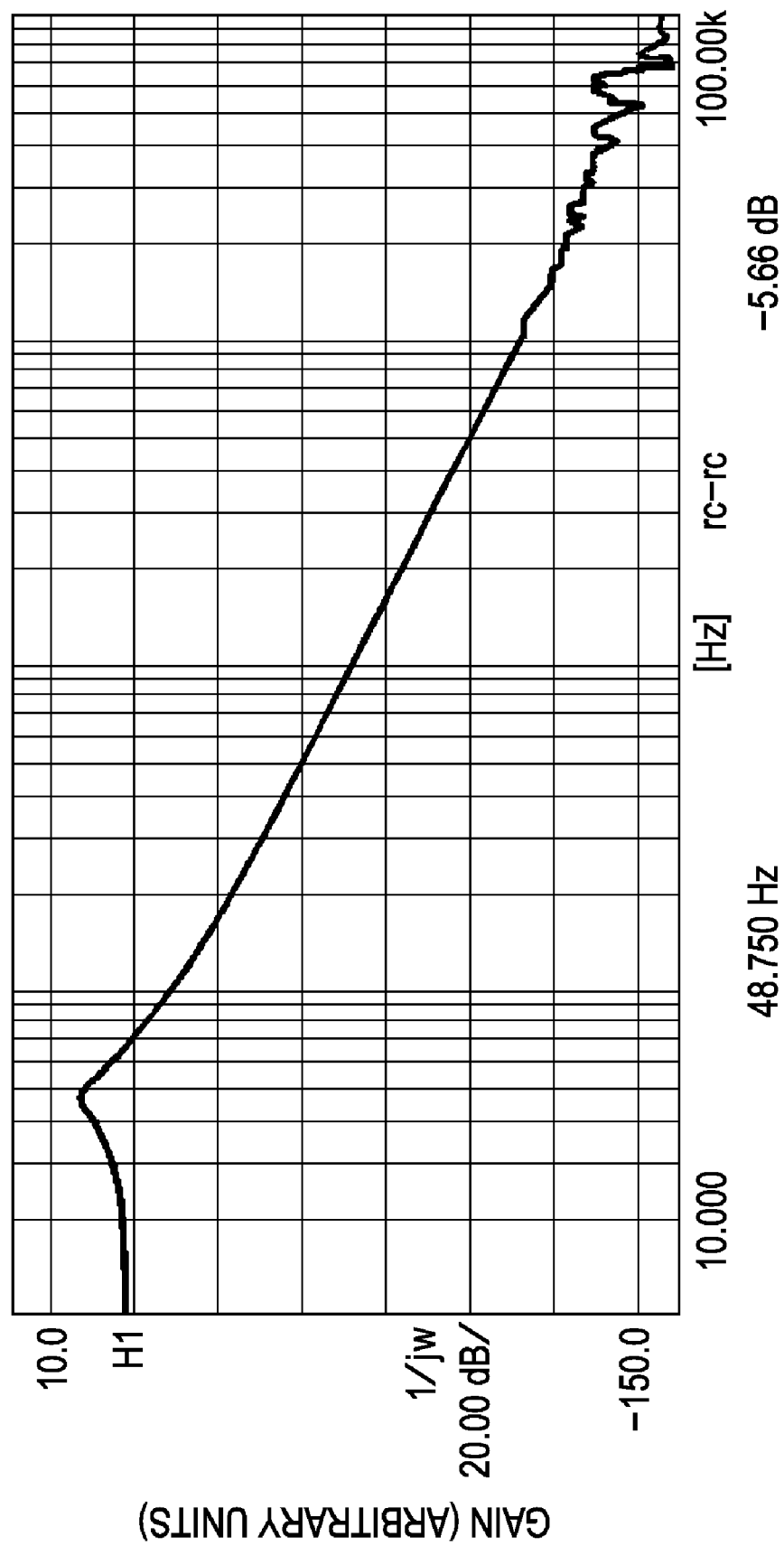
FIG. 11 is a Bode diagram of the transfer function used by the control system in a typical optical pickup apparatus.

More specifically, the actuator for the information recording medium is typically a voice coil motor with a second-order transfer function like that shown in FIG. 11. In the example shown in FIG. 11, first-order resonance occurs at 48 kHz, and the gain becomes fixed (i.e., a constant) at frequencies below 48 kHz. Consequently, since the gain is fixed for frequencies less than the first-order resonant frequency, the condition that α be a constant is satisfied.

Although the effects of the disturbance d are not completely eliminated at frequencies at or above the first-order resonant frequency, gain is suitably adjusted at frequencies below the first-order resonant frequency such that Rpp=d. By subsequently applying Rpp to the actuator P in a feed-forward control, the effects of the disturbance d are largely eliminated. In the present case, the Rpp controller C2 shown in FIG. 4 may be configured as a low-pass filter and gain controller having a passband cutoff frequency equal to the first-order resonant frequency, for example.

Figure 12:
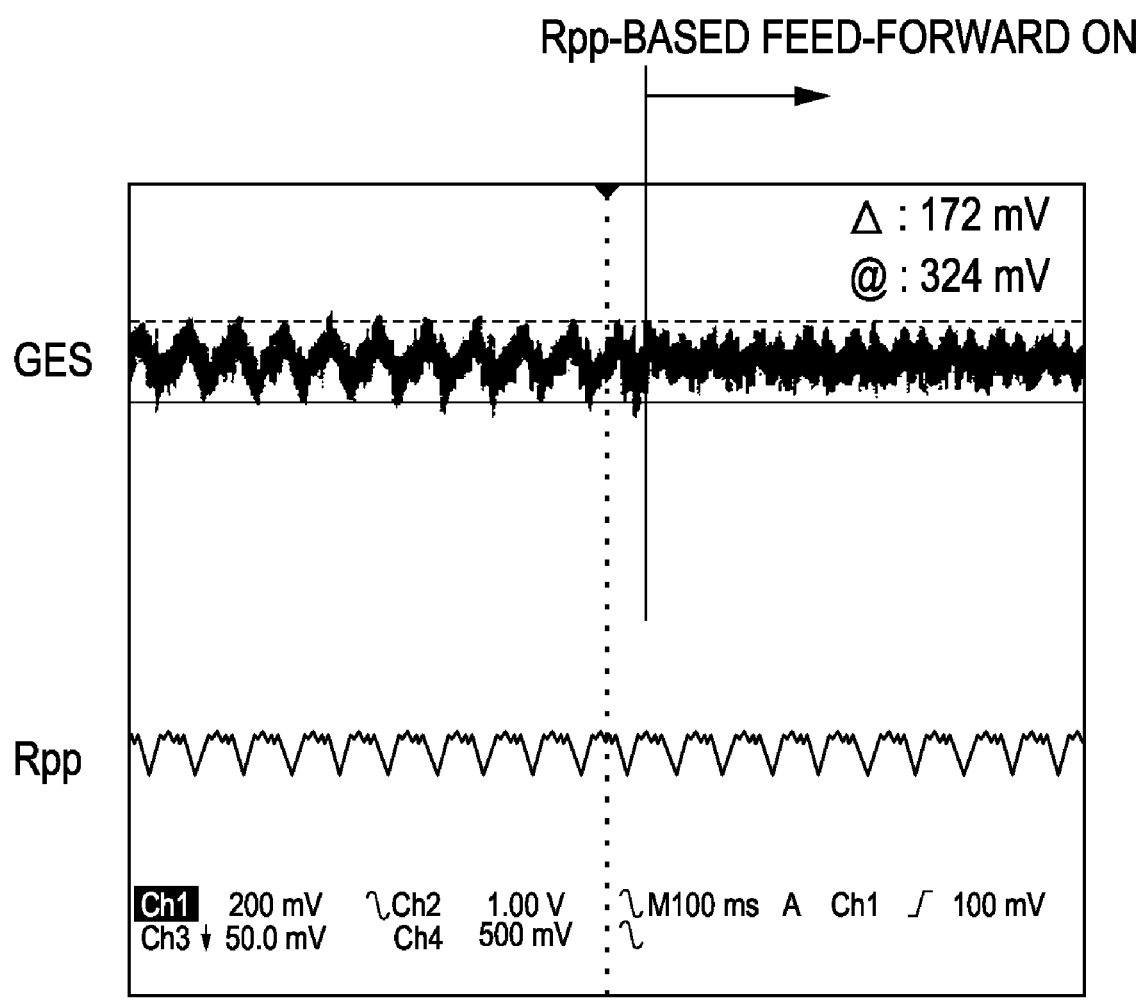
FIG. 12 is a diagram illustrating signal waveforms in accordance with an embodiment of the present invention.

FIG. 12 illustrates the results of operating a feed-forward servo using an Rpp signal in accordance with an embodiment of the present invention. The example shown in FIG. 12 shows the results measured for a disc-shaped information recording medium at a rotational frequency of 3000 rpm. It can be seen that gap error amplitude is decreased by operating the feed-forward servo, and thus that gap-maintaining performance is improved.

As shown in FIG. 4, in an optical pickup apparatus in accordance with an embodiment of the present invention, it is preferable to add the radial push-pull signal Rpp immediately before reaching the control object 44. The above configuration is preferable for the following reasons.

The feed-forward signal obtained from the radial push-pull signal Rpp is in phase with the runout disturbance signal. Meanwhile, the servo filter 42 (i.e., C1 in FIG. 4) is typically an integrating filter, and thus a feed-forward signal input prior to the servo filter 42 is output as an antiderivative of the input signal. For this reason, correct control results are not obtained.

In contrast, if the radial push-pull signal Rpp is input into the control object 44 (i.e., P in FIG. 4), the actuator is driven by a signal that is in phase with the runout disturbance signal, and thus control is conducted without phase-related problems. Consequently, the radial push-pull signal Rpp is preferably added immediately before reaching the control object 44.

However, operation of the apparatus without phase shifting occurring when the above radial push-pull signal Rpp is input into the control object 44 (i.e., P) corresponds to the case wherein the frequency characteristics of the control object 44 (i.e., P) are DC flat (i.e., fixed gain). In other words, such operation occurs at frequencies below the first-order resonant frequency of the actuator that acts as the control object 44. Consequently, in the case of a disc-shaped information recording medium, the rotational frequency of the medium is preferably less than the first-order resonant frequency of the control object.

In ordinary optical disc systems of the related art that do not use near-field light, a tilt control is conducted on the basis of a focus error signal (see Japanese Patent Nos. 2699412 and 2718064, for example). From the relationship, focus error signal ∝ amount of surface runout ∝ amount of tilt a tilt servo attempts to control tilt using the focus error signal.

In contrast, the present invention implements a near-field system to read and write information. Unlike the above, the near-field system of the present invention attempts to correct a gap error signal that is equivalent to the focus error signal derived from the amount of tilt. In a system using an SIL, it is not feasible to use a separate sensor to precisely measure the skew of the SIL itself from the amount of reflected light.

However, by using the amount of reflected light received via the SIL, it is possible to directly measure the amount of tilt at the control position. More specifically, in the present invention, more precise gap control is achieved by using a feed-forward control to correct the amount of tilt.

As described above, the point at which the Rpp signal is applied as part of the feed-forward control is preferably not between the adder 41 and the adder 43, but rather immediately before reaching the control object 44, as shown in FIG. 4. In addition, in the case of a disc-shaped information recording medium, the rotational frequency of the medium is preferably less than the first-order resonant frequency of the control object. In so doing, precise gap control is reliably achieved.

According to an embodiment of the present invention, more precise gap control is achieved compared to systems of the related art, and thus it also becomes possible to achieve more precise tilt control conducted after the gap control.

As described in the foregoing, according to an embodiment of the present invention, residual error in the gap servo is improved as a result of conducting a feed-forward control, whereby a push-pull signal in the direction orthogonal to the relative travel direction of an information recording medium is applied to a gap error signal. Moreover, according to an embodiment of the present invention, it becomes possible to improve servo performance without raising the servo band.

In addition, according to an embodiment of the present invention, a servo is used that, unlike a repeating servo, does not involve external memory (i.e., does not involve storing a repeating gap signal for a single rotation). For this reason, it is possible to simplify apparatus configuration.

Furthermore, although the push-pull signal is computed from a gap error signal, since the push-pull signal is thereby susceptible to the effects of gap error fluctuations (i.e., tracking errors that the gap servo is unable to correct), systems of the related art typically normalize the gap error. However, in the present invention, gap tracking ability can be improved, and thus the present invention is advantageous in that normalization processing like the above can be omitted.

It should be appreciated that the present invention is not limited to those configurations described with respect to the foregoing exemplary embodiments, and that various modifications and alterations are possible without departing from the scope of the present invention.

In addition, in the optical pickup apparatus, the optical read/write apparatus, and the optical write method of the present invention, the information recording medium that is read from and/or written to may be a read-only medium that uses a pattern of pits and lands, a writeable medium that uses a dye layer, a readable/writeable medium that uses a phase change layer or magneto-optical recording layer, or a medium that uses optically-assisted magnetic recording.

What is claimed is:

1. An optical pickup apparatus, comprising:
    a light source;
    focusing optics that irradiate an information recording medium by radiating light from the light source as near-field light;
    a light detector that detects the amount of reflected light from the information recording medium due to total internal reflection;
    a controller that generates a control signal based on a detection signal obtained from the light detector; and
    a drive unit that drives the focusing optics to a specific position on the information recording medium;
    wherein the controller is configured to generate a gap servo signal by conducting a feed-forward control, whereby a push-pull signal in a direction substantially orthogonal to a relative travel direction of the information recording medium is applied to a gap error signal obtained from the light detector.

2. The optical pickup apparatus according to claim 1, wherein the focusing optics includes an optical lens and a solid immersion lens.

3. The optical pickup apparatus according to claim 1, wherein
    the information recording medium is a substantially disc-shaped medium, and
    the push-pull signal is a push-pull signal in a substantially radial direction of the information recording medium.

4. The optical pickup apparatus according to claim 1, wherein the controller includes a servo filter that receives the push-pull signal as input, and the optical pickup apparatus further comprises:
    a computational unit that adds the output from the servo filter to a reference value of the controller.

5. The optical pickup apparatus according to claim 4, wherein a rotational frequency of the information recording medium when reading and/or writing is not less than approximately 3000 revolutions per minute (rpm).

6. An optical read/write apparatus, comprising:
    an optical pickup apparatus, being provided with
        a light source,
        focusing optics that irradiate an information recording medium by radiating light from the light source as near-field light,
        a light detector that detects the amount of reflected light from the information recording medium due to total internal reflection,
        a controller that generates a control signal based on a detection signal obtained from the light detector, and
        an optics drive unit that drives the focusing optics to a specific position on the information recording medium;
    an information recording medium loading unit; and
    a media drive unit that causes the information recording medium loading unit to move relative to the focusing optics provided in the optical pickup apparatus;
    wherein the controller provided in the optical pickup apparatus is configured to generate a gap servo signal by conducting a feed-forward control, whereby a push-pull signal in a direction substantially orthogonal to a relative travel direction of the information recording medium is applied to a gap error signal obtained from the light detector.

7. The optical read/write apparatus according to claim 6, wherein the focusing optics includes an optical lens and a solid immersion lens.

8. A gap control method, comprising the step of:
    conducting a feed-forward control, whereby a push-pull signal in a direction substantially orthogonal to a relative travel direction of an information recording medium is applied to a gap error signal obtained by detecting an amount of reflected light between an optical lens and the information recording medium due to total internal reflection, thereby causing a gap servo signal to be obtained.

* * * * *